United States Patent
Zevgolis

(10) Patent No.: US 6,338,357 B1
(45) Date of Patent: Jan. 15, 2002

(54) FLUID CATCH DEVICE ADAPTED TO PREVENT SPILLS WHEN USED DURING REMOVAL OF A DRAIN PLUG LOCATED IN AN AREA OF LIMITED ACCESS

(76) Inventor: Frank E. Zevgolis, 803 Jackson Rd., Colesville, MD (US) 20904

( * ) Notice: Subject to any disclaimer, the term of this patent is extended or adjusted under 35 U.S.C. 154(b) by 0 days.

(21) Appl. No.: 09/438,321

(22) Filed: Nov. 12, 1999

(51) Int. Cl.⁷ ............ B25B 13/48; B65B 1/04; F16N 31/00
(52) U.S. Cl. ............ 137/15.16; 137/312; 81/177.2; 81/180.1; 141/86; 141/98; 141/311 A; 184/1.5; 222/108; 7/100; 220/573
(58) Field of Search ............ 137/1, 312, 15.16; 184/1.5, 106; 81/177.2, 180.1, 121.1; 7/100; 141/86, 98, 311 A, 331, 364, 365, 114, 351 R; 220/571, 573; 222/108

(56) References Cited

U.S. PATENT DOCUMENTS

| | | | |
|---|---|---|---|
| 1,582,758 A | * 4/1926 | Jones | 184/1.5 |
| 1,668,245 A | 5/1928 | McGowan | 184/1.5 |
| 1,686,749 A | 10/1928 | Higgins et al. | 184/1.5 |
| 1,687,980 A | * 10/1928 | Higgins et al. | 184/1.5 |
| 1,994,844 A | 3/1935 | Winger et al. | 184/1.5 |
| 2,746,330 A | 5/1956 | Pfetzing | 184/1.5 |
| 3,049,334 A | 8/1962 | Montague | 184/1.5 |
| 3,391,953 A | 7/1968 | Jordan | |
| 4,230,002 A | 10/1980 | Skidmore | 81/121.1 |
| 4,714,138 A | 12/1987 | Zaccone | 184/1.5 |
| 4,800,933 A | 1/1989 | Moore et al. | 141/98 |
| 4,951,721 A | 8/1990 | Moore et al. | 141/98 |
| 5,259,426 A | 11/1993 | Burleigh et al. | 141/98 |
| 5,402,643 A | 4/1995 | Buchanan et al. | 60/605.3 |
| D363,501 S | 10/1995 | Daniel | D15/150 |
| 5,722,508 A | 3/1998 | Kraus | 184/1.5 |
| 5,852,961 A | 12/1998 | Kotowski | 81/180.1 |
| 5,881,841 A | * 3/1999 | Mason | 184/1.5 |
| 5,975,244 A | * 11/1999 | Mason | 184/1.5 |
| 5,979,516 A | * 11/1999 | Grant | 141/331 |

* cited by examiner

*Primary Examiner*—George L. Walton
(74) *Attorney, Agent, or Firm*—Pillsbury Winthrop LLP

(57) ABSTRACT

A fluid catch device is adapted to prevent spills when used during removal of a drain plug located in an area of limited access. The fluid catch device is particularly well-suited for use on motorcycles or other vehicles wherein access to an engine fluid drain plug is limited by a glide plate or other obstruction. The fluid catch device comprises an elongated fluid receptacle, a fluid port, and a tool tube. The fluid receptacle has an open end and an opposite end. The fluid port is in fluid communication with the fluid receptacle and is adapted to drain fluid from the fluid receptacle. The tool tube extends at least from the opposite end of the fluid receptacle toward the open end of the fluid receptacle. The tool tube has a proximal end that opens outside of the opposite end of the fluid receptacle and a distal end directed toward the open end of the fluid receptacle. The tool tube is adapted to receive a drain plug loosening tool. The fluid receptacle and tool tube preferably have a combined length that is larger than a distance between a fluid drain obstruction and a fluid drain in the area of limited access. The fluid receptacle is narrow enough to engage a surface surrounding the fluid drain while the proximal end extends out from the area of limited access, beyond the fluid drain obstruction. The fluid receptacle preferably is adapted to remain engaged to the surface during removal of the drain plug, thereby to prevent splashing of access limiting features in the area of limited access. A method of removing a drain plug in a spill-less manner, from a fluid drain located in an area of limited access, also is provided.

35 Claims, 11 Drawing Sheets

FLUID CATCH DEVICE ADAPTED TO PREVENT SPILLS WHEN USED DURING REMOVAL OF A DRAIN PLUG LOCATED IN AN AREA OF LIMITED ACCESS

BACKGROUND OF THE INVENTION

The present invention relates to a fluid catch device adapted to prevent spills when used during removal of a drain plug located in an area of limited access.

It has become customary practice in the motorcycle industry to equip motorcycles with glide plates (also known as skid plates and case plates). Typically, these glide plates are found on motocross or off-road motorcycles, but they also can be provided on other motorcycles (e.g., street motorcycles). The glide plate protects the engine parts and/or frame of the motorcycle when the motorcycle "bottoms out" or otherwise is subjected to impact from below or in front of the engine. Similar glide plates are provided on many four-wheel and three-wheel all-terrain vehicles.

Glide plates, especially those found on off-road motorcycles and vehicles, tend to have a sled-like configuration that is coextensive with most or all of the engine's bottom surfaces and, in most cases, coextensive with a significant part of the engine's front surface. Such glide plates have proven effective at protecting engine components, especially crank cases. Unfortunately, however, they also have complicated the process of changing engine fluids.

Drain plugs for engine fluids, such as engine oil, tend to be located at or near the bottom of the engine. This positioning is dictated by the effects of gravity. The typical glide plate, therefore, obstructs or severely limits access to the drain plug. It is at least inconvenient, if not impractical or impossible, to remove the glide plate every time an engine fluid has to be drained. The glide plate is designed to withstand significant impact. It therefore must be attached securely to the motorcycle or other vehicle. It is not uncommon for the glide plate to be attached using fasteners that are coated with a thread-locking compound. Generally, secure attachment is inconsistent with rapid removal of the glide plate. Most manufacturers therefore sacrifice convenience in favor of strength and reliability, by rigidly attaching the glide plate in a manner that makes removal difficult, if not impossible.

While some, if not most, glide plate manufacturers, motorcycle manufacturers, and motorcycle owners have attempted to resolve this problem by providing an access hole for the drain plug, the access hole typically is very small. Few, if any, access holes are larger than two inches in minor diameter. Generally, the access hole is just large enough to permit removal of the drain plug. In some glide plates, the access hole is oval instead of circular. Most oval access holes fall within a range of minor and major diameters of about 1⅜ to 1½ inches for the minor diameter and about 2 to 2½ inches for the major diameter. Larger holes typically are not desirable because they correspondingly increase the amount of surface area on the motorcycle's engine that remains vulnerable to intrusion and/or impact from below. Larger holes also may reduce the glide effect provided by the glide plate.

The small size of the typical access hole, however, makes removal of the drain plug a messy operation. As the drain plug is progressively loosened, engine fluid tends to seep out around the plug. The fluid then gushes out rapidly as soon as the plug is withdrawn from its opening. As gravity draws the fluid out, it strikes the plug and the tool, if any, that was used to remove the plug. Fluid thereby splashes throughout the inside of the glide plate, and some splashes out through the access hole. Such splashing is especially undesirable when the engine fluid is hot. Hot engine fluid can cause burn injuries if it strikes the skin. At the very least, it can be uncomfortable and messy if it reaches the skin.

Eventually, some of the fluid that is splashed behind the glide plate makes its way out from behind the glide plate and contaminates the ground. Whatever fluid remains behind the glide plate tends to accumulate dirt. The conventional drain plug removal technique on a motorcycle therefore can result in burns and/or uncomfortable exposure to hot fluids. It also results in both ground contamination and a sludgy mess inside the glide plate. On most ground surfaces, a dangerously slippery residue remains.

The resulting contamination of the ground with engine fluids is unsightly, dangerous, and environmentally harmful. The cumulative effects of such ground contamination can lead to ground water contamination as well. The negative environmental impact of such ground contamination and ground water contamination has received much attention in recent years. As a result, measures have been taken to regulate the disposal of engine fluids. Some of these measure have been implemented at great expense and inconvenience. Any spills that result from conventional drain plug removal techniques are contrary to the goals served by such measures.

Recent efforts consistent with such measures have been directed to providing spill prevention devices for engine fluids in the automotive industry. Such efforts, however, have been focused on devices with large mouths that fit over the typical car or truck drain plug, funnel-shaped fluid catches, or other dimensions, features, and/or shapes that make such devices incompatible with the access hole of at least some, if not all, motorcycle glide plates. Notably, most car and truck drain plugs are readily accessible.

Because access to a motorcycle's drain plug is severely limited when the motorcycle has a glide plate or similar obstruction, oil catch devices that have a large mouth cannot be positioned flush against the fluid reservoir of the engine to prevent the engine fluids from being spilled or splashed about the glide plate as the drain plug is removed and withdrawn. Likewise, cup-shaped catch devices that have radially extending drainage hoses or pipes cannot extend close enough to the fluid reservoir and drain plug of the typical motorcycle, to prevent spillage of the fluid behind the glide plate.

Some catch devices in the automotive industry have magnetic attachment mechanisms adapted to engage the ferrous metal pans or other engine parts of the automobile. In the context of motorcycle engines, however, aluminum parts tend to be more prevalent as a weight reduction measure. The magnetic attachment mechanisms found in the catch devices for automotive applications are ineffective when applied to the aluminum engine parts of motorcycle engines.

There is consequently a need in the art for a fluid catch device adapted to prevent spills when used during removal of a drain plug located in an area of limited access, such as the area behind the glide plate of a motorcycle or other vehicle. This need extends to a catch device having dimensions that facilitate insertion of the device into the area of limited access so that the device can engage the surface of the fluid reservoir around the drain plug, and remain engaged thereto during removal of the plug, thereby to prevent splashing of any access limiting features on the vehicle. There is also a need for a fluid catch device that can be secured in place under a motorcycle engine regardless of whether the parts of the engine are made of aluminum, some other non-ferrous or low-ferrous metal, or a non-metal material.

SUMMARY OF THE INVENTION

A primary object of the present invention is to overcome at least one of the foregoing problems and/or satisfy at least one of the foregoing needs by providing a fluid catch device adapted to prevent spills when used during removal of a drain plug located in an area of limited access, such as the area behind the glide plate of a motorcycle or other vehicle.

Another object of the present invention is to provide a fluid catch device having dimensions that facilitate insertion of the catch device into an area of limited access so that the catch device can engage the surface of a fluid reservoir around a drain plug, and remain engaged thereto during removal of the plug, thereby to prevent splashing of access limiting features in the area of limited access.

To achieve these and/or other objects, the present invention provides a fluid catch device adapted to prevent spills when used during removal of a drain plug located in an area of limited access. The fluid catch device comprises an elongated fluid receptacle, a fluid port, and a tool tube. The elongated fluid receptacle has an open end and an opposite end. The fluid port is in fluid communication with the fluid receptacle and is adapted to drain fluid from the fluid receptacle. The tool tube extends at least from the opposite end of the fluid receptacle toward the open end of the fluid receptacle. The tool tube has a proximal end that opens outside of the opposite end of the fluid receptacle and a distal end directed toward the open end of the fluid receptacle. The tool tube is adapted to receive a drain plug loosening tool. The fluid receptacle and tool tube have a combined length that is larger than a distance between a fluid drain obstruction and a fluid drain in the area of limited access. The fluid receptacle is narrow enough to engage a surface surrounding the fluid drain while the proximal end extends out from the area of limited access, beyond the fluid drain obstruction.

Preferably, the combined length is larger than a distance between a glide plate and a fluid drain located behind the glide plate.

The fluid receptacle can be adapted to remain engaged against the surface surrounding the fluid drain during removal of the drain plug from the fluid drain, to prevent splashing of fluid against the fluid drain obstacle.

Desirably, the combined length is at least 9 inches, and more desirably, between about 10 inches and about 12 inches. A preferred combined length is between about 10 inches and about 11 inches. The fluid receptacle preferably is at least 5 inches in length.

The fluid receptacle preferably is no wider than about 2 inches for a distance along its length of at least about 3 inches from the open end.

The opposite end of the fluid receptacle can be provided with a grommet that sealingly engages a circumferential surface of the tool tube. The tool tube preferably is axially slidable through the grommet to adjust spacing of the distal end of the tool tube from the open end of the fluid receptacle. The tool tube also can be rotatable within the grommet to effect turning of the drain plug.

Preferably, the tool tube comprises two resilient portions at which the distal and proximal ends, respectively, are defined, and a rigid intermediate portion defining the circumferential surface of the tool tube.

A stop mechanism adapted to limit the range of axial travel of the tool tube through the grommet, can be provided to prevent the tool tube from being inadvertently withdrawn completely out of the grommet.

A resilient adaptor may be disposed around the fluid receptacle, the resilient adaptor having dimensions and resiliency characteristics such that, when the resilient adaptor is inserted into an aperture of the fluid drain obstruction, which aperture has any diameter within a predetermined range, the resilient adaptor engages circumferential walls of the aperture with enough force to support the fluid catch device in the aperture, while permitting the open end of the fluid receptacle to reach the fluid drain.

Preferably, the fluid receptacle is tubular. In addition, the fluid port preferably is in fluid communication with an interior of the tool tube, to permit the flow of fluid from the fluid receptacle, through the fluid port, into the tool tube and out through the proximal end thereof.

The present invention also provides a fluid catch device adapted to prevent spills when used during removal of a drain plug located in an area of limited access. The fluid catch device comprises an elongated fluid receptacle, a fluid port, and a tool tube. The elongated fluid receptacle has an open end and an opposite end. The fluid port is in fluid communication with the fluid receptacle. The tool tube extends at least from the opposite end of the fluid receptacle toward the open end of the fluid receptacle. The tool tube has a proximal end that opens outside of the opposite end of the fluid receptacle and a distal end directed toward the open end of the fluid receptacle. The tool tube is adapted to receive a drain plug loosening tool. The fluid receptacle and tool tube have dimensions that facilitate insertion of the fluid receptacle into an area of limited access so that the fluid receptacle engages a surface surrounding a fluid drain in which the drain plug is received. The fluid receptacle is adapted to remain engaged to the surface during removal of the drain plug, thereby to prevent splashing of access limiting features in the area of limited access.

Desirably, the dimensions of the fluid receptacle and tool tube include a combined length of the fluid receptacle and tool tube that is at least about 9 inches. More desirably, the combined length is between about 10 inches and about 12 inches. A preferred combined length is between about 10 inches and about 11 inches. The fluid receptacle preferably is at least about 5 inches in length, and preferably is no wider than about 2 inches in diameter for a distance along its length of at least about 3 inches from the open end.

The opposite end of the fluid receptacle can be provided with a grommet that sealingly engages a circumferential surface of the tool tube. The tool tube preferably is axially slidable through the grommet to adjust spacing of the distal end of the tool tube from the open end of the fluid receptacle. Preferably, the tool tube also is rotatable within the grommet to effect turning of the drain plug.

The tool tube preferably comprises two resilient portions at which the distal and proximal ends, respectively, are defined, and a rigid intermediate portion defining the circumferential surface of the tool tube.

Preferably, the fluid catch device further includes a stop mechanism adapted to limit the range of axial travel of the tool tube through the grommet, to prevent the tool tube from being inadvertently withdrawn completely out of the grommet.

The fluid catch device also can be provided with a resilient adaptor disposed around the fluid receptacle, the resilient adaptor having dimensions and resiliency characteristics such that, when the resilient adaptor is inserted into an aperture of a fluid drain obstruction, which aperture has any diameter with a predetermined range, the resilient adaptor engages circumferential walls of the aperture with enough force to support the fluid catch device in the aperture, while permitting the open end of the fluid receptacle to reach the fluid drain.

The fluid receptacle preferably is tubular, and preferably, the fluid port is in fluid communication with an interior of the tool tube, to permit the flow of fluid from the fluid receptacle, through the fluid port, into the tool tube and out through the proximal end thereof.

Also provided by the present invention, is a method of removing a drain plug in a spill-less manner, from a fluid drain located in an area of limited access. The method comprises the steps of: providing a fluid catch device having a fluid receptacle and a drain plug loosening tool, the fluid catch device having dimensions that facilitate insertion of the fluid receptacle into the area of limited access so that the fluid receptacle engages a surface surrounding the fluid drain; inserting the fluid receptacle into the area of limited access so that the fluid receptacle engages the surface surrounding the fluid drain and so that the drain plug loosening tool engages the drain plug; actuating the drain plug loosening tool to loosen the drain plug from the fluid drain; removing the drain plug from the fluid drain while keeping the fluid receptacle engaged against the surface surrounding the fluid drain, so that substantially all fluid draining from the fluid drain enters the fluid receptacle; and directing the fluid from the fluid receptacle, out of the area of limited access, substantially without contaminating the area of limited access with such fluid.

Preferably, the method further comprises the step of withdrawing a portion of the drain plug loosening tool from the fluid catch device after the actuating step, and the step of removing the drain plug is performed by rotating a tool tube that holds a remaining other portion of the drain plug loosening tool.

Preferably, rotation of the tool tube during removal of the drain plug causes the tool tube to move axially with respect to the fluid receptacle away from the surface surrounding the fluid drain, so that the fluid receptacle can remain engaged with the surface during removal of the drain plug. The step of directing the fluid from the fluid receptacle preferably is performed through the tool tube.

Preferably, the area of limited access is limited by a vehicle glide plate, and the step of inserting the fluid receptacle into the area of limited access comprises the step of inserting the fluid receptacle through a hole in the vehicle glide plate. The vehicle glide plate can be 1½ inches or more (e.g., 2 inches or more) from the fluid drain.

The method can further comprise the step of resiliently engaging a circumferential wall of the hole with an external surface of the fluid catch device so that the fluid catch device remains supported by the glide plate after the step of inserting the fluid receptacle into the area of limited access.

The above and other objects and advantages will become more readily apparent when reference is made to the following description taken in conjunction with the accompanying drawings.

DESCRIPTION OF PREFERRED EMBODIMENTS

As illustrated in FIGS. 1–5C, a preferred embodiment of the present invention provides a fluid catch device 10 adapted to prevent spills when used during removal of a drain plug 12 located in an area 14 of limited access.

Figure 1:
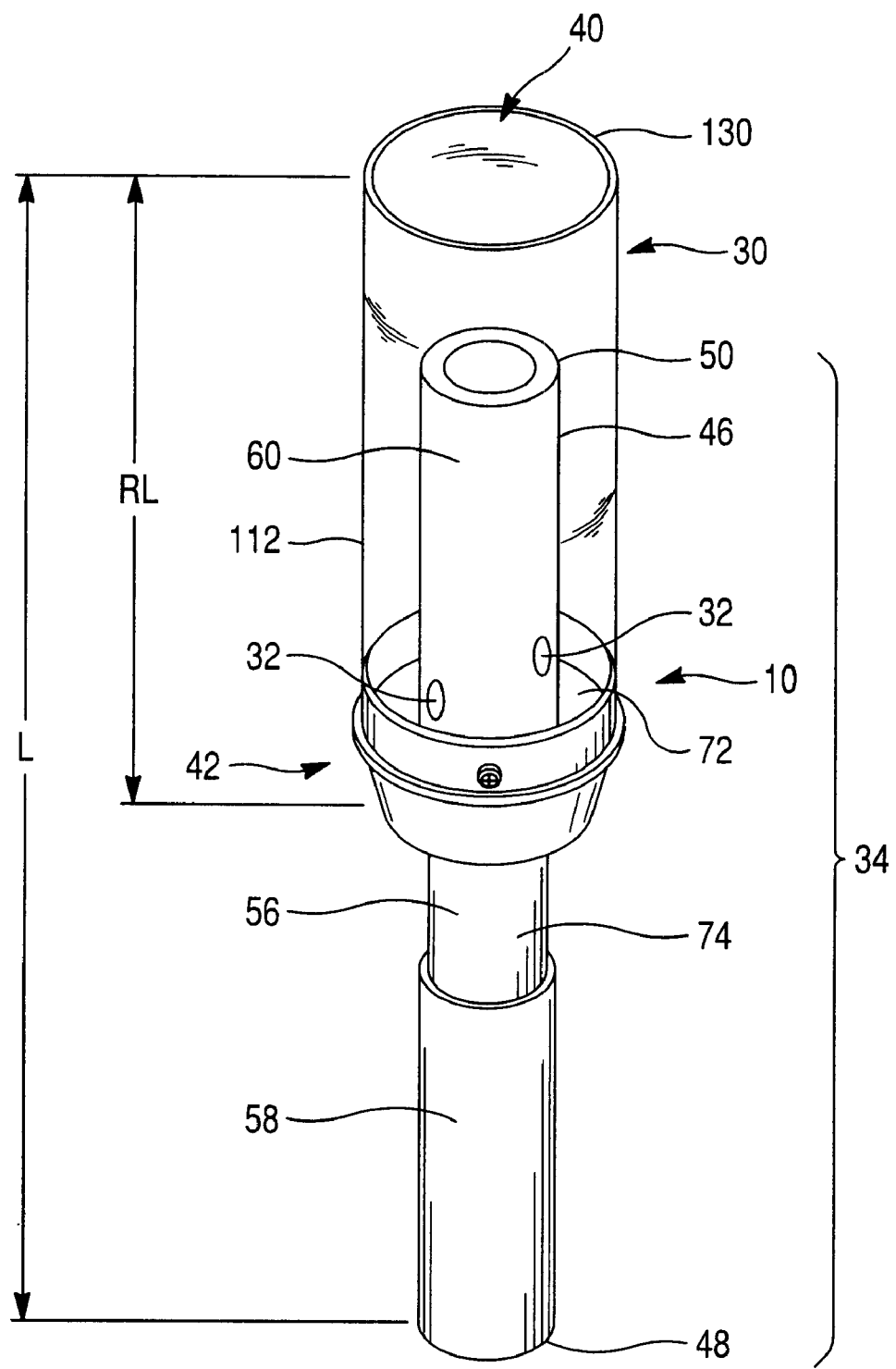
FIG. 1 is a perspective view of a fluid catch device according to a preferred embodiment of the present invention.
Figure 2:
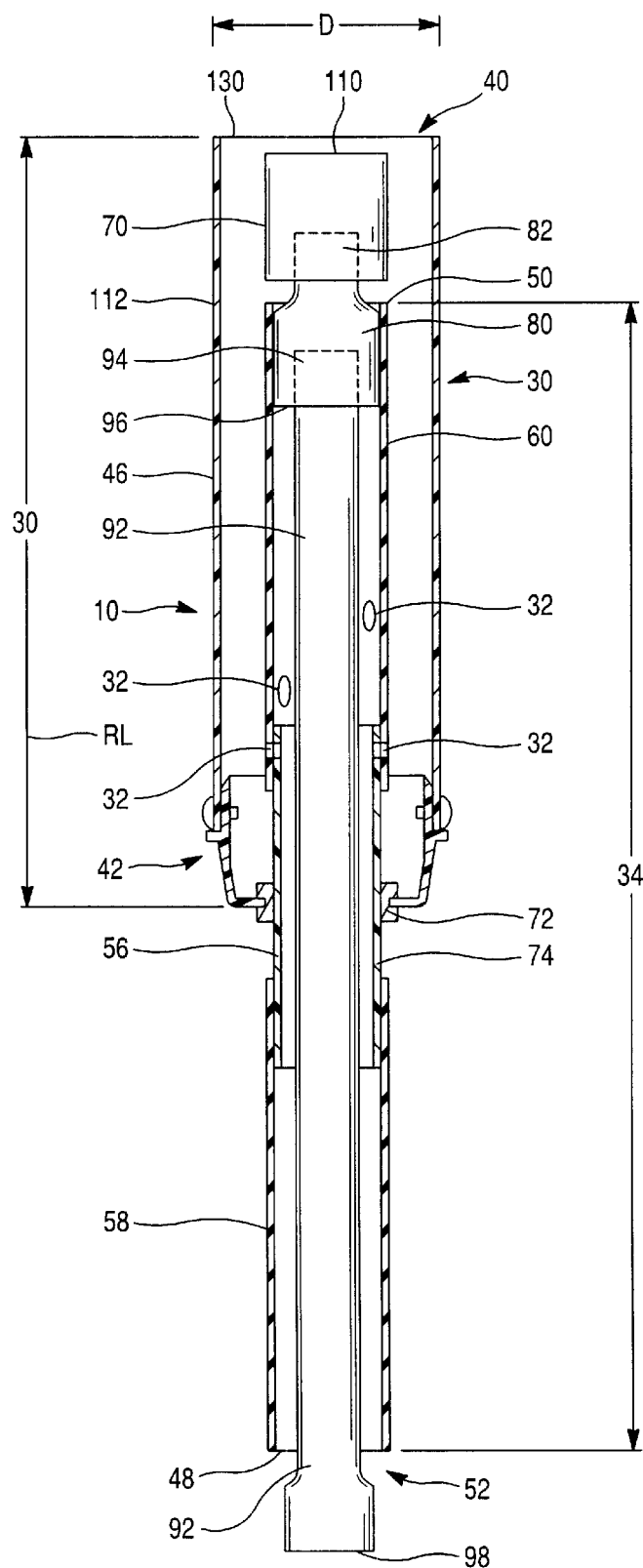
FIG. 2 is a cross-sectional view of the embodiment shown in FIG. 1.
Figure 3:
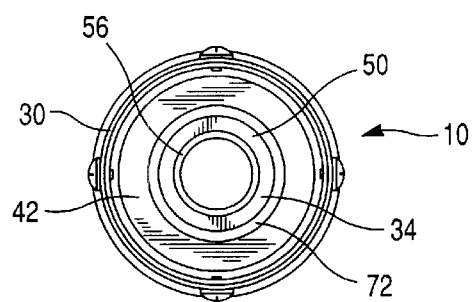
FIG. 3 is a top view of the embodiment shown in FIG. 1.
Figure 4:
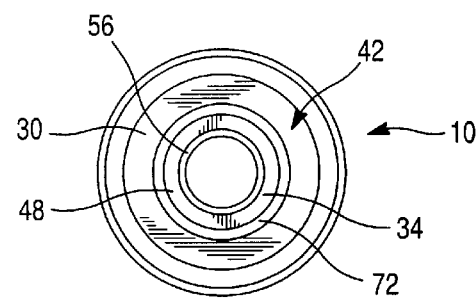
FIG. 4 is a bottom view of the embodiment shown in FIG. 1.
Figure 5A:
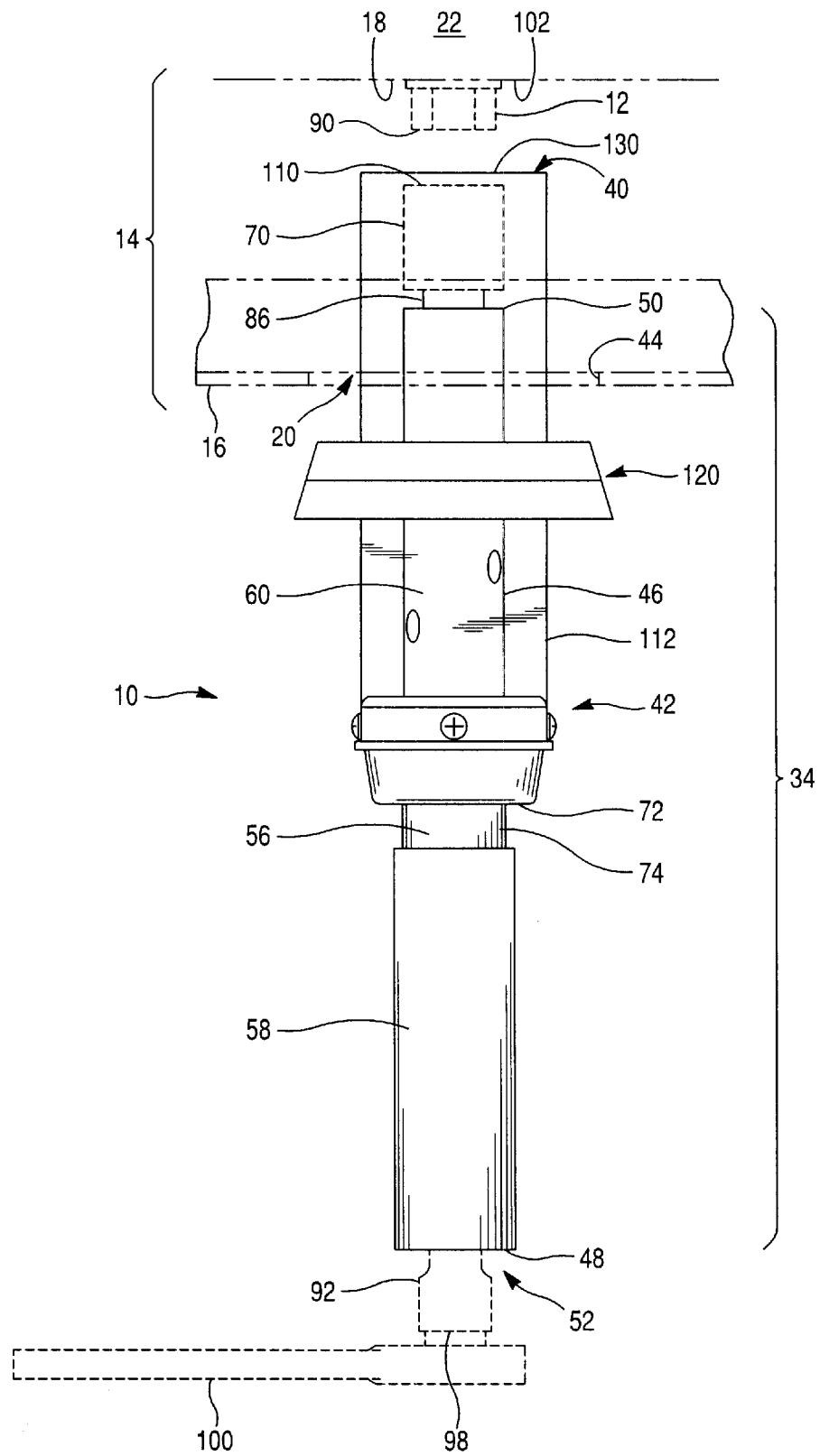
FIG. 5A is an elevation view of the embodiment shown in FIG. 1 as it is being inserted through the access hole of a glide plate.
Figure 5B:
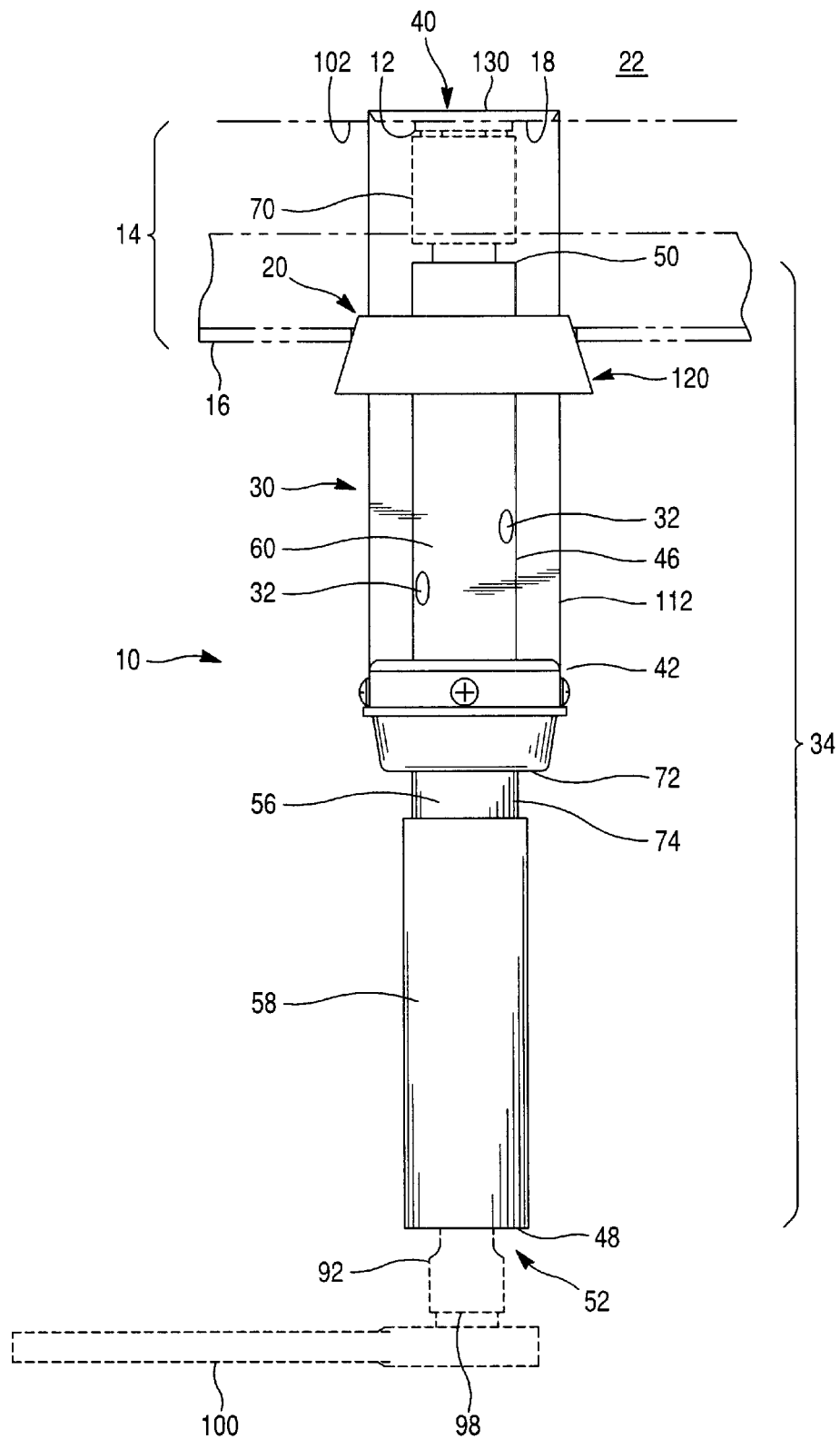
FIG. 5B is an elevation view similar to 5A, but taken as the drain plug is engaged by a drain plug loosening tool associated with the embodiment of FIG. 1.
Figure 5C:
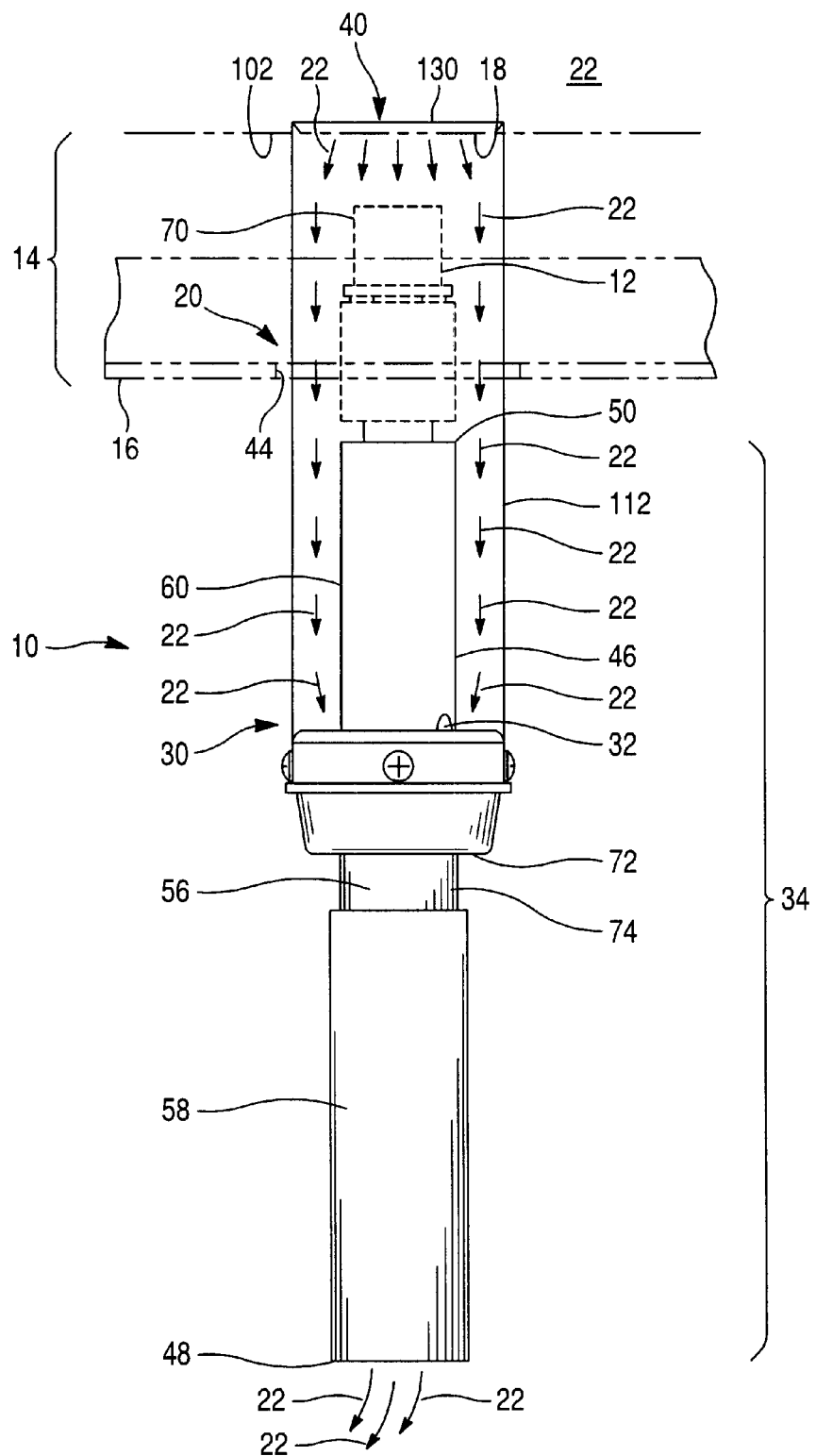
FIG. 5C is an elevation view similar to FIGS. 5A and 5B, but taken as the drain plug is removed from its associated fluid drain.

As shown in FIGS. 5A–5C, a preferred use of the fluid catch device 10 arises in the context of draining engine oil or other engine fluids from a vehicle equipped with a glide plate 16 or other protective device that limits access to the engine's fluid drain 18. Typically, the glide plate 16 has a relatively small access hole 20 through which limited access to the drain plug 12 is provided. The fluid catch device 10 enables the fluid 22 (also indicated by arrows in FIG. 5C) to be drained through the small access hole 20 without splashing the area 14 behind the glide plate 16 and without spilling the fluid 22. Use of the fluid catch device 10, of course, is not limited to the preferred use. Other fields of use exist in connection with vehicles or otherwise.

The exemplary fluid catch device 10 comprises an elongated fluid receptacle 30, a fluid port 32, and a tool tube 34. The fluid receptacle 30 preferably is tubular and has an open end 40 and an opposite end 42. The fluid receptacle 30 preferably is translucent or transparent to permit visualization of its contents, or at least to permit visualization of the fluid level in the receptacle 30. Preferably, the fluid receptacle 30 is made of polypropylene or some other resilient plastic. Other materials, of course, will suffice.

The use of resilient materials is preferred on the fluid receptacle 30 because, in addition to being relatively inexpensive, resilient materials can provide certain benefits. Resilient materials, for example, can be compressed during insertion into the access hole 20 of the glide plate 16. When the resilient material is provided with a diameter slightly larger than the access hole 20, the circumferential wall 44 of the access hole 20 is able to compress the resilient material during insertion of the fluid catch device 10 into the access hole 20. The resilient material's resistance to compression exerts a radially outward force on the circumferential wall 44. This radially outward force facilitates frictional retention of the fluid receptacle 30 in the access hole 20. The dimensions of the fluid receptacle 30 and the resilient material preferably are selected so that the frictional force is just enough or slightly more than enough to support the weight of the fluid catch device 10 when it is filled with fluid 22. The frictional force, in this regard, can be manually overridden when removal of the fluid catch device 10 is desired. The result is a convenient fluid catch device 10 that allows the user to insert the device 10 through the access hole 20 and release it without having the device 10 fall out from the access hole 20.

The more resilient the material is, or the greater its range of compressibility, the better the material will be at accommodating different diameters of access holes 20. This provides a significant advantage inasmuch as different glide plates 16 may have access holes 20 of different diameter. The use of a highly resilient material thus provides a more universally applicable fluid catch device 10.

The fluid port 32 is in fluid communication with the fluid receptacle 30. In the exemplary embodiment, the fluid port 32 is defined by one or more openings through a wall 46 of the tool tube 34. The fluid port 32 is adapted to drain fluid 22 from the fluid receptacle 30. While the fluid port 32 can be located elsewhere on the fluid catch device 10, it preferably does not extend radially out from the fluid receptacle 30 unless it does so far enough from the open end 40 of the fluid receptacle 30 that it will not interfere with insertion of the fluid receptacle 30 into the area 14 of limited access. In the preferred context of a vehicle equipped with a glide plate 16, therefore, any fluid port 32 extending radially out from the fluid receptacle 30 preferably is farther from the open end 40 of the fluid receptacle 30 than the glide plate 16 is from the fluid drain 18.

The tool tube 34, in the exemplary embodiment, extends at least from the opposite end 42 of the fluid receptacle 30 toward the open end 40 of the fluid receptacle 30. The tool tube 34 has a proximal end 48 and a distal end 50. The proximal end 48 opens outside of the opposite end 42 of the fluid receptacle 30. The distal end 50 is directed toward the open end 40 of the fluid receptacle 30. The tool tube 34 is adapted to receive a drain plug loosening tool 52, as will be described hereinafter.

Preferably, the tool tube 34 has a rigid intermediate portion 56 and two resilient portions 58,60. The two resilient portions 58,60 include the proximal and distal ends 48,50, respectively. Preferably, each of the two resilient portions 58,60 is defined by a hose made of rubber or other resilient material(s). The rigid intermediate portion 56 preferably is defined by a sleeve of polyvinyl chloride. Other materials, of course, will suffice.

Figure 13:
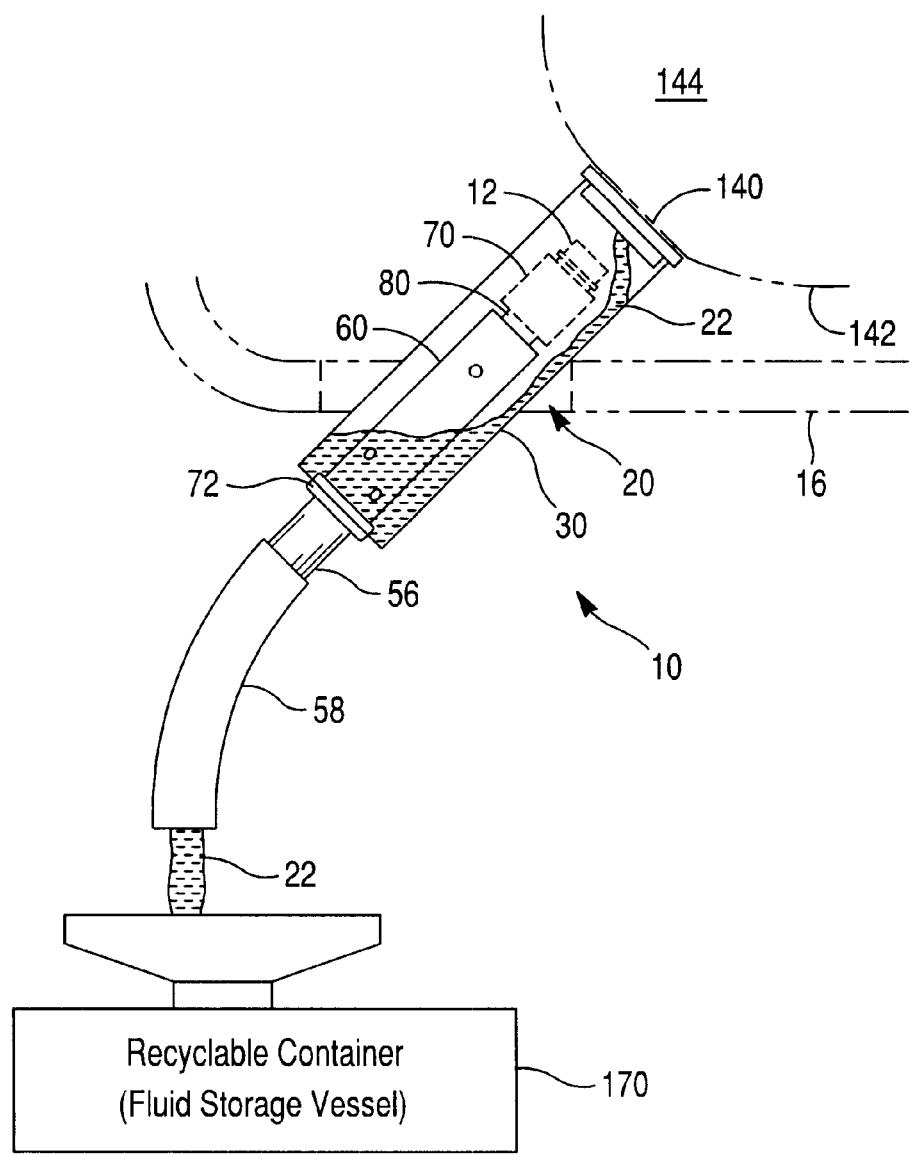
FIG. 13 is an elevational view showing an exemplary positioning of the fluid catch device shown in FIGS. 8–12, after removal of the drain plug, as the fluid drains from the fluid reservoir of the vehicle and is directed into a fluid storage vessel.

Resiliency is a desirable characteristic of the resilient portion 58 located outside of the fluid receptacle 30 because it allows bending of that portion 58 toward a fluid storage vessel (as shown in FIG. 13 where the vessel is designated using reference numeral 170) or otherwise away from the ground, preferably in any desired direction. This is especially useful where ground clearance is very limited. Resiliency also is a desirable characteristic of the resilient portion 60 located inside the fluid receptacle 30 because it facilitates retention of drain plug engaging features 70, drain plug loosening tools 52, and/or portions thereof, as will be described hereinafter.

Preferably, the rigid intermediate portion 56 has an outer diameter that is substantially equal to the inner diameter of the resilient portions 58,60. The resilient portions 58,60 therefore can be secured to the rigid intermediate portion 56 by sliding them onto respective longitudinal ends of the intermediate portion 56. An adhesive or other means can be used to reinforce the interconnection between the intermediate portion 56 and each resilient portion 58,60.

Preferably, the opposite end 42 of the fluid receptacle 30 has a grommet 72 that sealingly engages a circumferential surface 74 of the tool tube 34. Preferably, the grommet 72 sealingly engages the circumferential surface 74 of the tool tube's intermediate portion 56 so that fluid 22 in the fluid receptacle 30 cannot leak out at the interface between the tool tube 34 and the grommet 72.

The material defining the circumferential surface 74 (e.g., polyvinyl chloride) of the intermediate portion 56 preferably is selected so as to permit manual sliding of the tool tube 34 axially through the grommet 72 without detrimentally affecting the sealing characteristics of the grommet-tool tube interface. Axial sliding of the tool tube 34 serves to adjust the spacing between the distal end 50 of the tool tube 34 and the open end 40 of the fluid receptacle 30. This adjustment, in turn, can be used to bring a plug engaging feature 70 into contact with the drain plug 12, and also to permit movement of that feature 70 axially along with the drain plug 12 as the drain plug 12 is advanced out of the fluid drain 18.

By providing the resilient portion 60 inside the fluid receptacle 30 with an outer diameter that is larger than that of the intermediate portion 56, the transition between that resilient portion 60 and the intermediate portion 56 serves as a stop mechanism. It keeps axial movement of the tool tube 34 through the grommet 72 from inadvertently resulting in complete withdrawal of the tool tube 34 out from the grommet 72.

The other resilient portion 58 (i.e., the resilient portion 58 located outside of the fluid receptacle 30) likewise provides a stop mechanism. In particular, by providing the resilient portion 58 of the tool tube 34 outside of the fluid receptacle 30 with a larger outer diameter than that of the intermediate portion 56, the transition between that resilient portion 58 and the intermediate portion 56 serves as a stop mechanism that limits how far the distal end 50 of the tool tube 34 can slide axially with respect to the fluid receptacle 30.

While the foregoing stop mechanisms are provided integrally with the tool tube 34, it is understood that alternative stop mechanisms can be provided. Such stop mechanisms can be separate from the tool tube 34 and can be adapted to effect the stopping function by engaging the tool tube 34 or by engaging a feature connected thereto.

The tool tube 34 likewise is rotatable within the grommet 72. This facilitates turning of a drain plug engagement feature 70 when it is mounted to the distal end 50 of the tool tube 34. The drain plug 12 therefore can be turned by turning the tool tube 34 within the grommet 72 while the drain plug engagement feature 70 engages the drain plug 12.

The tool tube 34, of course, can be provided as a unitary tube (i.e., without the three-piece construction that is illustrated). A single flexible tube can be provided, for example, and the grommet 72 and/or its interface with the flexible tube can be modified to facilitate the desired axial and rotational movement of the tube 34, without compromising the fluid seal therebetween. A wiper-like fluid seal (not shown) or alternative sealing structures can be provided between such a unitary tube and the grommet 72.

Preferably, the resilient portions 58,60 of the illustrated tool tube 34 have an inner diameter of about ⅝ of an inch, and the intermediate portion 56 has an outer diameter of about ⅝ of an inch. These dimensions advantageously permit insertion of a short conventional socket extension 80 having a ⅜ inch drive 82 into the distal end 50 of the tool tube 34. Preferably, the resiliency of the distal end 50 causes the distal end 50 to squeeze against the short extension 80 with enough force that the short extension 80 remains rotationally and axially in place within the tool tube 34, with the ⅜ inch drive 82 projecting out from the distal end 50 of the tool tube 34. In addition, or alternatively, the short extension 80 can be clamped, glued, or otherwise bonded into the distal end 50. The fluid port(s) 32 preferably is (are) all located far enough away from the distal end 50 of the tool tube 34 that the short extension 80 does not interfere with fluid flow through the port(s) 32.

A conventional wrench socket 70 can be mounted to the ⅜ inch drive 82. When loosening of the drain plug 12 is desired, the wrench socket 70 is engaged against the head 90 of the drain plug 12, and a longer extension 92 is inserted through the tool tube 34 from the proximal end 48 thereof. The longer extension 92 is long enough that its driving end 94 can be received in the driven end 96 of the short extension 80, while the driven end 98 of the longer extension 92 protrudes from the proximal end 48 or is located just inside the proximal end 48. A correspondingly configured socket wrench 100 then can be connected to the driven end 98 of the longer extension 92 and can be actuated to loosen the drain plug 12 while the socket 70 at the short extension 80 engages the drain plug 12.

Different drain plugs 12 can have different head configurations. The ⅜ inch drive 82 on the short extension 80 facilitates use of many conventional wrench sockets 70 irrespective of each socket's internal configuration. The ⅜ inch drive 82 is desirable because of the common availability of ⅜ inch sockets 70. It is understood, however, that other drive arrangements (e.g., ⅝ inch, ¼ inch) can be provided on the short extension 80, whether conventional or not. The internal diameter of the tool tube 34, in this regard, can be modified in order to accommodate different types and sizes of drain plug loosening tools 52.

Notably, upon loosening the drain plug 12, a portion (e.g., 92,100) of the drain plug loosening tool 52 can be removed from the tool tube 34 before fluid 22 begins to flow out of the drain 18. In particular, the longer extension 92 and the socket wrench 100 can be removed, and the proximal end 48 of the tool tube 34 can be directed toward an appropriate fluid storage vessel 170 (e.g., an empty oil jug, oil pan, or the like as shown in FIG. 13). This leaves an unobstructed fluid passageway through the inside of the tool tube 34, from each fluid port 32 to the proximal end 48 and into the fluid storage vessel.

Since the short extension 80 remains frictionally retained by the distal end 50 of the tool tube 34, manual turning of the tool tube 34 causes the short extension 80, the socket 70, and the drain plug 12 to continue turning. During such turning, the grommet 72 allows axial sliding of the tool tube 34. This is a desirable aspect of the exemplary embodiment because the open end 40 of the fluid receptacle 30 can be kept against the surface 102 surrounding the fluid drain 18 during removal of the drain plug 12, even though turning of drain plug 12 causes the head 90 of the drain plug 12 and the tool tube 34 to move away from that surface 102. Thus, when fluid 22 begins to flow out from the fluid drain 18 as a result of continued turning of the drain plug 12, the fluid receptacle 30 is able to catch substantially all of the draining fluid 22, including the fluid 22 that is splashed radially outwardly by the head 90 of the drain plug 12. The glide plate 16 (or other fluid drain obstacles) therefore is not splashed.

The fluid 22 flowing into the fluid receptacle 30 eventually reaches the fluid ports 32 and is free to travel out from the proximal end 48 of the tool tube 34, through the unobstructed fluid passageway therein, and into the storage vessel 170. Notably, this fluid flow can be provided without contaminating the area 14 between the glide plate 16 and the engine (one surface of which is designated using reference numeral 102), and also without contaminating the ground or ground water.

Preferably, the fluid receptacle 30 and tool tube 34 have a combined length L that is larger than a distance between a fluid drain obstruction (e.g., guide plate 16) and a fluid drain 18 in the area 14 of limited access. This allows the tool tube 34 to extend out of the area 14 of limited access, even when the fluid receptacle 30 makes contact with the surface 102 surrounding the drain 18.

In the exemplary implementation, therefore, the combined length L of the fluid receptacle 30 and the tool tube 34 preferably is larger than the distance between the glide plate 16 and the fluid drain 18, and preferably enough to reach a storage vessel 170 for the fluid in a convenient manner. Based on a known range of existing access hole diameters, it is desirable to provide a combined length L of at least about 9 inches. More desirably, the combined length L is between about 10 inches and about 12 inches. A preferred combined length L is between about 10 inches and about 11 inches. The foregoing exemplary ranges strike a favorable balance between the extreme of requiring too much ground clearance so that the likelihood of exceeding the fluid catching capacity of the receptacle 30 is minimized, and the opposite extreme of minimizing the fluid catching capacity of the fluid receptacle 30 to accommodate situations where the ground clearance is minimal.

A desirable length RL of the fluid receptacle 30 is at least about 5 inches, and more desirably, the length RL of the fluid receptacle 30 is between about 5 inches and about 7 inches. This range also strikes a favorable balance between ground clearance and fluid catching capacity.

The fluid receptacle 30 preferably is narrow enough to engage the surface 102 surrounding the fluid drain 18 while the proximal end 48 of the tool tube 34 extends out from the area 14 of limited access, beyond the fluid drain obstruction. In the preferred implementation, therefore, the fluid receptacle 30 is narrow enough (and/or is otherwise dimensioned) to fit through the access hole 20 in the glide plate 16 or other protective device. The fluid receptacle 30, in this regard, has a desirable exterior diameter D smaller than or equal to about 2 inches, at least for a distance along its length of about 3 inches from the open end 40, and preferably for a distance along its length no less than about 4 inches. More desirably, the exterior diameter D of the fluid receptacle 30 is between about 1⅞ inches and about 2 inches.

Preferably, the respective lengths of the fluid receptacle 30 and the resilient portion 60 located inside the fluid receptacle 30, are selected so that the stop mechanism located between that resilient portion 60 and the intermediate portion 56 does not come into contact with the grommet 72 until at least the maximum amount of axial travel required for removal of the drain plug 12 has been achieved.

In addition, the stop mechanism located outside of the fluid receptacle 30 preferably is arranged so that the limit on axial movement toward the open end 40 is reached when the surface 110 of the shortest typical wrench socket 70 would reach the surface 102 surrounding the drain 18. This can be achieved by suitably selecting the length of the resilient portion 60 inside the fluid receptacle 30 and the length of the intermediate portion 56.

The following chart provides exemplary values of the combined length L, the fluid receptacle length RL, and the diameter D of the fluid receptacle 30 for different exemplary motorcycle models:

| MODEL | L | RL | D |
| --- | --- | --- | --- |
| 1999 Honda CR500R | 10 inches | 5 inches | 1⅞ inches |
| 1999 Honda CR250R | 10 inches | 5 inches | 1⅞ inches |
| 1999 Suzuki RM 250 | 10 inches | 5 inches | 1⅞ inches |
| 1999 Yamaha YZ 250 | 10 inches | 5 inches | 1⅞ inches |
| 1999 Kawasaki KX 250 | 10 inches | 5 inches | 1⅞ inches |
| 1999 Suzuki RM 125 | 10 inches | 5 inches | 1⅞ inches |
| 1999 Yamaha YZ 400F | 11 inches | 6 inches | 1.06 inches |

Since many glide plates 16 have access hole diameters that are within a few millimeters of one another, it is possible to accommodate all such glide plates 16 by providing the fluid receptacle 30 with a standard external diameter based on the largest of such access holes 20 and with a sufficiently resilient circumferential surface 112 that the fluid receptacle 30 can be squeezed into the smaller access holes 20. As the foregoing chart demonstrates, several different motorcycle models from different manufacturers are compatible with the exemplary combined length L of 10 inches, the exemplary receptacle length RL of 5 inches, and the exemplary receptacle diameter D of 1⅞ inches.

In addition or alternatively, wider ranges of differences in diameter can be accommodated by filing away at the circumferential wall 44 of the smallest access holes 20 to selectively enlarge them enough to permit entry of the fluid receptacle 30 with the standard external diameter. The access hole 20 of the glide plate 16 on the 1999 Yamaha YZ 400 F, for example, can be filed away to make it compatible with the exemplary receptacle diameter D of 1⅞ inches.

A kit can be provided that includes the fluid catch device 10, a template, and/or a file. The template can be positioned around an existing access hole 20 that is too small, and a marker or other writing implement can be used along with the template to create an outline of another access hole that optimally receives the fluid receptacle 30. After the outline is drawn, the file can be used to file away portions of the glide plate 16 that fall within that outline. The access hole 20 thus can be modified to receive, or to better accommodate, the fluid receptacle 30. The file can be provided as part of the kit or can be provided by the person performing the glide plate modification. Preferably, the access hole 20 is oval, rather than circular, with the minor diameter of the oval preferably extending toward opposite lateral sides of the glide plate 16 and with the major diameter of the oval extending toward the front and rear of the glide plate 16. The oval shape is preferred over circular because it achieves a relative reduction in drag and reduces the likelihood of snagging when the motorcycle or other glide-plate-equipped vehicle "bottoms out." The oval shape also can facilitate gripping of the fluid receptacle 30 by the rim of the access hole 20 when the fluid receptacle 30 is obliquely oriented with respect to the glide plate 16. With respect to oval-shaped holes, the foregoing exemplary diameters and ranges thereof represent the minor diameter of the oval.

The template is therefore preferably oval. Alternative templates that are circular, or otherwise non-oval, also can be used to provide corresponding modifications to the access hole 20.

The fluid catch device 10 may further comprise a resilient adaptor 120 (shown in FIGS. 5A and 5B) disposed around the fluid receptacle 30. The internal diameter of the adaptor 120 preferably is provided so that the fluid receptacle 30 is snugly received in the adaptor 120. The resilient adaptor 120 has dimensions and resiliency characteristics such that, when the resilient adaptor 120 is inserted into an aperture of the fluid drain obstruction (e.g., the access hole 20 of a glide plate 16), which aperture has any diameter within a predetermined range, the resilient adaptor 120 engages the circumferential walls 44 of the aperture with enough force to support the fluid catch device 10 in the aperture, while permitting the open end 40 of the fluid receptacle 30 to reach the fluid drain 18. The predetermined range preferably is selected based on the known or anticipated range of all or a select group of access hole diameters in existing glide plates 16 or other protective devices. An exemplary predetermined range is about 1¾ inches to about 1⅞ inches. Other ranges will become readily apparent based on the access hole diameters and the teachings herein.

Alternative ranges of aperture diameters (e.g., access hole diameters in glide plates 16) can be accommodated (1) by modifying the dimensions and resiliency characteristics of the adaptor 120, (2) by providing multiple, interchangeable adaptors 120, each having a different size, (3) and/or by providing each adaptor 120 with a stepped or progressively increasing external diameter (e.g., a frustoconical external shape).

A commercial advantage of the illustrated arrangement is that it can be sold without the socket 70, extensions 80,92, and/or wrench 100. Multiple sockets 70, one for each possible type of drain bolt 12, therefore, need not be produced for sale along with the fluid catch device 10. Instead, many purchasers can obtain identical devices and then use their own existing tools that are compatible with their respective drain bolts 12, thereby saving on the overall cost of the system. The illustrated arrangement, in this regard, makes efficient use of existing tools.

Alternatively, if it becomes desirable to sell drain plug engaging features 70 with the fluid catch device 10, such features can be provided integrally or otherwise at the distal end 50 of the tool tube 34. Other compromises between these two schemes can be provided as well. The distal end 50 of the tool tube 34, for example, can be provided with a fitting that resembles and operates in the same way as the socket driver 82 or the short extension 80. Likewise, the short extension 80 can be provided as part of the fluid catch device 10.

While the lip 130 of the fluid receptacle 30 is illustrated as having a circular shape that is symmetrically arranged about a point on the longitudinal axis of the fluid receptacle 30, it is understood that alternative lip 130 configurations can be provided. The lip 130, for example, can be contoured to match known surface features surrounding existing fluid drains.

Figure 6:
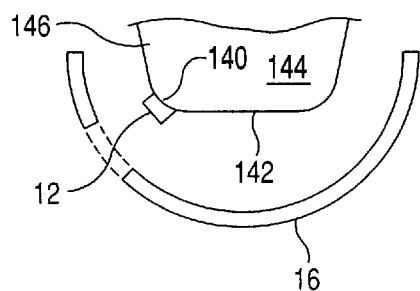
FIG. 6 is a fragmentary, partially cross-sectional view of an alternative location of a drain plug.
Figure 7:
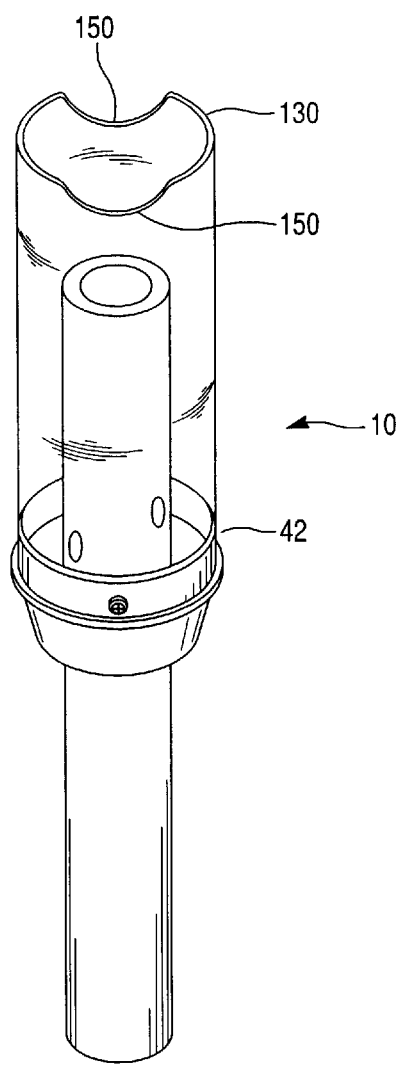
FIG. 7 is a perspective view of a fluid catch device adapted for use on the drain plug illustrated in FIG. 6.
Figure 8:
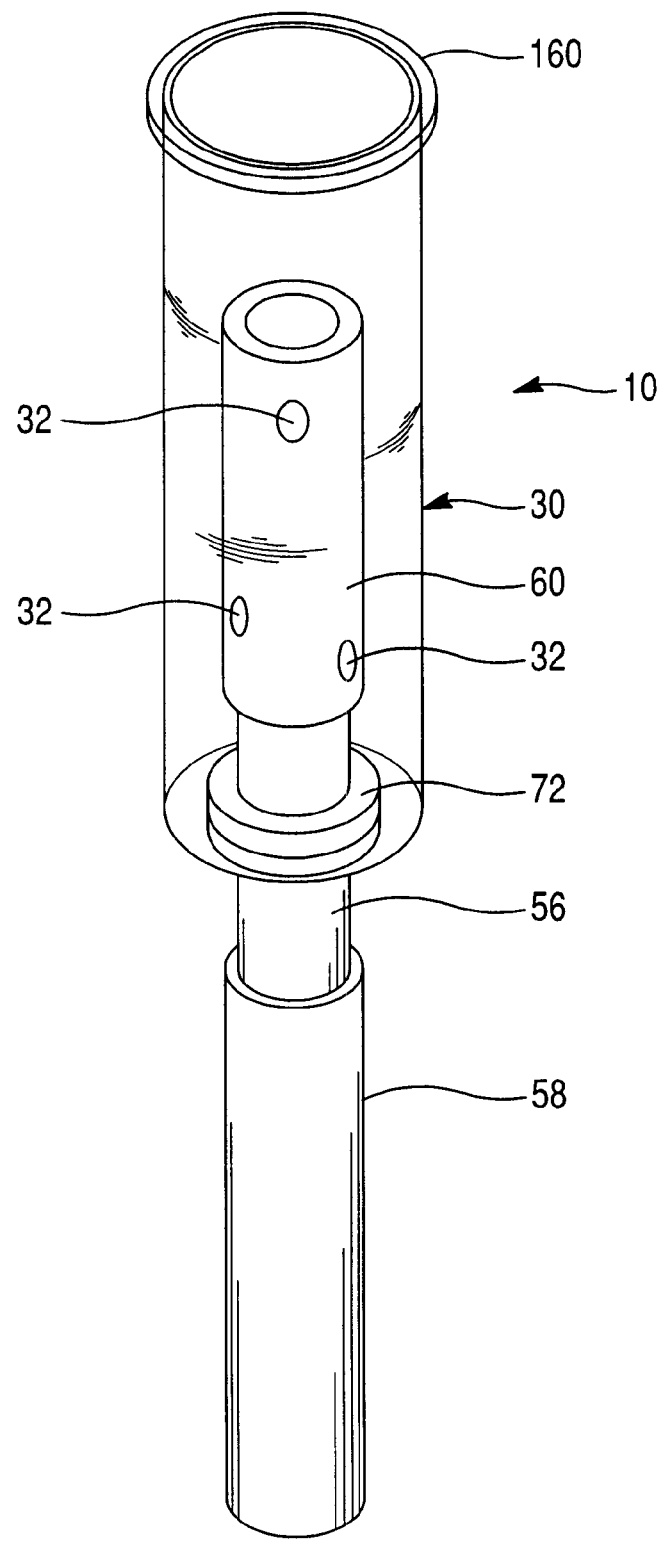
FIG. 8 is a perspective view of a fluid catch device according to an alternative embodiment of the present invention.
Figure 9:
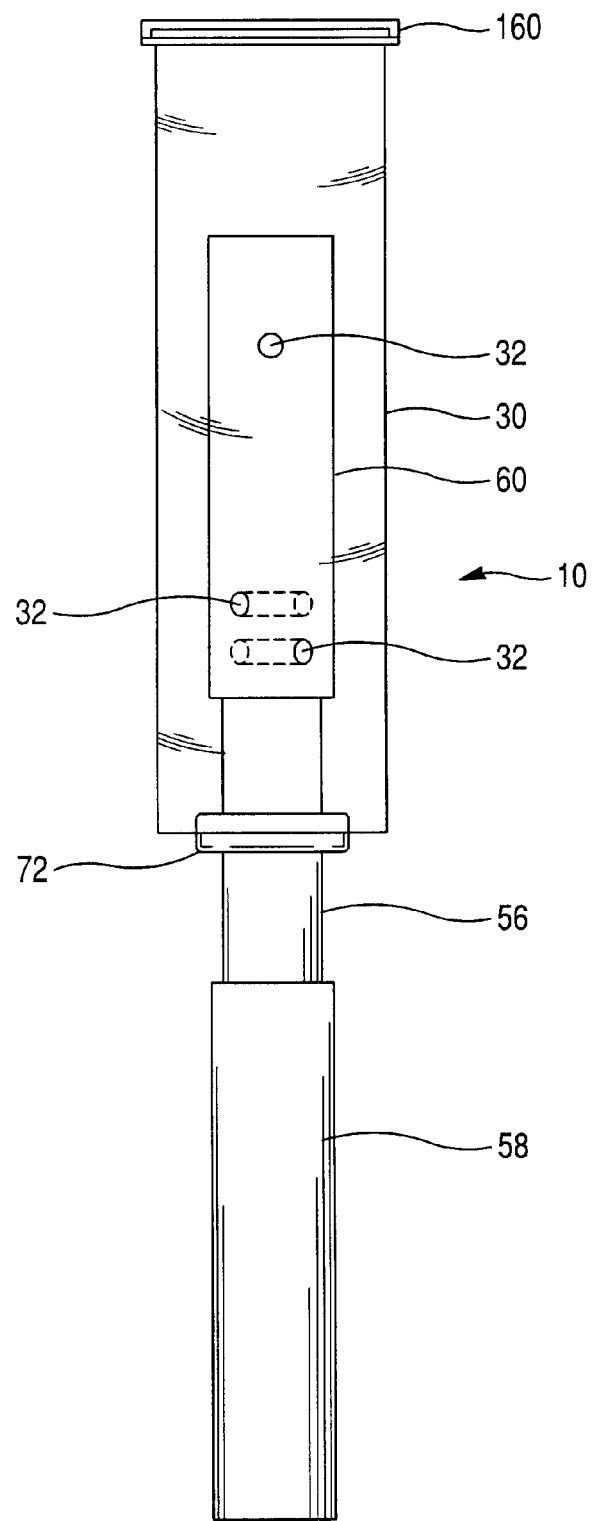
FIG. 9 is an elevation view of the fluid catch device shown in FIG. 8.
Figure 10:
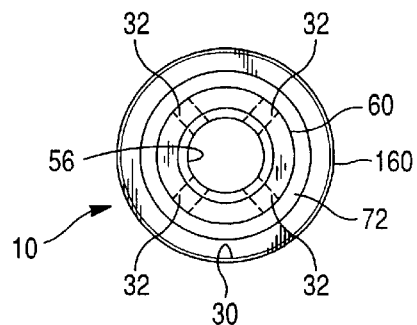
FIG. 10 is a top view of the fluid catch device shown in FIGS. 8 and 9.
Figure 11:
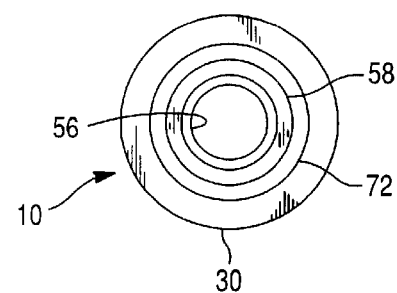
FIG. 11 is a bottom view of the fluid catch device shown in FIGS. 8–10.

As shown in FIG. 6, for example, some fluid drains 18 are located at or near the transition 140 between the bottom 142 of a fluid reservoir 144 and a side wall 146 thereof. A lip 130, as shown in FIG. 7, therefore can be adapted to engage both surfaces 142,146 simultaneously, in order to prevent splashing of the surrounding area during removal of the drain plug 12. The lip 130, in this regard, can dip toward the opposite end 42 of the fluid receptacle 30, at diametrically opposed locations 150 around the circumference of the fluid receptacle 30, which dips 150 accommodate the transition 140 between the side wall 146 and bottom 142 of the fluid reservoir 144. Alternative forms of lip contouring can be provided depending upon the contour of the surface 102 surrounding the drain plug 12.

The present invention also provides a method of removing a drain plug 12 in a spill-less manner, from a fluid drain 18 located in an area 14 of limited access (e.g., located behind a glide plate 16 or similar protective device).

Included in the method is the step of providing a fluid catch device. The fluid catch device 10 preferably is provided in accordance with one of the embodiments described above. The fluid catch device 10, in this regard, can have a fluid receptacle 30 and a drain plug loosening tool 52 as shown in FIGS. 1–7. The fluid catch device 10 has dimensions that facilitate insertion of the fluid receptacle 30 into the area 14 of limited access so that the fluid receptacle 30 engages a surface 102 surrounding the fluid drain 18.

The method also includes the step (represented by the differences between FIGS. 5A and 5B) of inserting the fluid receptacle 30 into the area 14 of limited access so that the fluid receptacle 30 engages the surface 102 surrounding the fluid drain 18 and so that the drain plug loosening tool 52 engages the drain plug 12.

The drain plug loosening tool 52 then is actuated to loosen the drain plug 12 from the fluid drain 18. The drain plug 12 then is removed, as shown in FIG. 5C, from the fluid drain 18 while keeping the fluid receptacle 30 engaged against the surface 102 surrounding the fluid drain 18. Substantially all of the fluid 22 draining from the fluid drain 18 thus enters the fluid receptacle 30.

According to the preferred implementation of the method, the fluid 22 from the fluid receptacle 30 is directed out of the area 14 of limited access, substantially without contaminating the area 14 of limited access with such fluid 22.

Preferably, the method further comprises the step of withdrawing a portion of the drain plug loosening tool 52 (e.g., the longer extension 92 and the wrench 100) from the fluid catch device 10 after the actuating step. The step of removing the drain plug 12 then is performed by rotating a tool tube 34 that holds a remaining other portion (e.g., the short extension 80 and the socket 70) of the drain plug loosening tool 52.

Preferably, rotation of the tool tube 34 during removal of the drain plug 12 causes the tool tube 34 to move axially with respect to the fluid receptacle 30 away from the surface 102 surrounding the fluid drain 18, so that the fluid receptacle 30 can remain engaged with the surface 102 during removal of the drain plug 12.

The step of directing the fluid 22 from the fluid receptacle 30 preferably is performed through the tool tube 34. This provides a significant advantage over other drainage arrangements. In particular, it allows the draining process to be performed through the very space that was vacated by the removed portion of the drain plug loosening tool 52. In very narrow access holes 20, there may not be enough room for both a tool access tunnel and a separate drain hole with sufficient capacity to handle the volume of fluid flowing out of the drain 18. The exemplary embodiment's ability to use the same space for both the tool 52 and the draining operation thus allows more of the access hole 20 in the glide plate 16 to be used by the draining operation than would be possible if a separate tool tunnel were required. The resulting arrangement therefore can be applied to narrower access holes 20 than might otherwise be possible.

According to a preferred implementation of the method, the area 14 of limited access is limited by a vehicle glide plate 16 and the step of inserting the fluid receptacle 30 into the area 14 of limited access comprises the step of inserting the fluid receptacle 30 through an access hole 20 in the vehicle glide plate 16. The vehicle glide plate 16 can be at least 1½ inches (e.g., 2 inches or more) from fluid drain 18.

The method also can comprise the step of resiliently engaging a circumferential wall 44 of the access hole 20 with an external surface 112 of the fluid catch device 10 so that the fluid catch device 10 remains supported by the glide plate 16 after the fluid receptacle 30 is inserted into the area 14 of limited access.

While the method of the present invention can be performed using different sequences of the forgoing steps, a preferred implementation begins with insertion of the short extension 80 into the distal end 50 of the tool tube 34. A socket 70 matching the head configuration of the drain plug 12 then is mounted to the driving end 82 of the short extension 80.

Next, the tool tube 34 is pushed further forward into the fluid receptacle 30, preferably until the outside resilient portion 58 stops against the grommet 72. The fluid catch tool 10 then is inserted into the access hole 20 of the glide plate 16 or other obstructions, so that the socket 70 engages the head 90 of the drain plug 12. If the socket 70 and head 90 of the drain plug 12 are not properly aligned, the tool tube 34 alone, or the entire fluid catch device 10, can be turned until proper engagement is confirmed by a significant resistance to turning. If the circumferential surface 112 of the fluid receptacle 30 does not snugly engage and retain the circumferential wall 44 of the access hole 20, an adapter 120 can be used. In particular, the adapter 120 is wedged between the fluid receptacle 30 and the circumferential wall 44 of the access hole 20, so that the fluid catch device 10 is frictionally retained in the access hole 20.

Next, the longer extension 92 is inserted through the proximal end 48 of the tool tube 34 until its driving end 94 engages and mates with the driven end 96 of the short extension 80. The socket wrench 100 then is applied to the driven end 98 of the longer extension 92. The socket wrench 100 is turned to loosen the drain plug 12.

As soon as the drain plug 12 is loosened enough that manual turning of the tool tube 34 causes the drain plug 12 to turn, the longer extension 92 and the socket wrench 100 are removed from the tool tube 34, via the proximal end 48 thereof. The proximal end 48 then is directed toward, or into, a suitable fluid storage vessel 170, and the tool tube 34 is manually turned. Turning of the tool tube 34 causes the short extension 80 and the socket 70 to turn. The drain plug 12 therefore continues to become loosened, and eventually is removed from the fluid drain 18.

Since further loosening and removal of the drain plug 12 causes it to move axially out of the fluid drain 18, the tool tube 34 moves axially through the grommet 72 as the tool tube 34 is turned. This allows the open end 40 of the fluid receptacle 30 to be kept snug against the surface 102 surrounding the fluid drain 18, thereby to prevent splashing of any adjacent components (e.g., the glide plate 16) when the fluid 22 begins to flow out around the drain plug 12.

When fluid 22 does flow out of the fluid drain 18, it is captured by the fluid receptacle 30 and eventually flows through the fluid port(s) 32 into the tool tube 34. The fluid 22 then flows through the tool tube 34, out the proximal end 48 thereof, and into the fluid storage vessel 170. Advantageously, spilling of the fluid 22 behind the glide plate 16 or other obstructions is avoided, despite the limitations on access imposed by such obstructions. In addition, ground contamination is completely avoided. After all of the fluid 22 has drained, the fluid catch device 10 can be manually removed by pulling it firmly out of the access hole 20, with enough force to overcome the slight frictional retention provided by the circumferential wall 112 of the fluid receptacle 30 and/or adapter 120. The drain plug 12 then can be re-inserted and tightened, in preparation for refilling of the fluid reservoir.

With reference to FIGS. 8–11, an alternative embodiment of the fluid catch device 10 can be provided with a grommet 72 and fluid receptacle 30 that are integrally formed. The exemplary embodiment shown in FIGS. 8–11 also includes a removable cap 160 at the open end 40 of the fluid receptacle 30. The removable cap 160 advantageously keeps any fluid residue that remains in the receptacle 30 from leaking out of the receptacle 30 when the fluid catch device 10 is stored. It also keeps dirt and dust out of the fluid receptacle 30 when the fluid catch device 10 is not being used. It will be appreciated from the present disclosure that the cap 160 can be provided with different shapes and configurations to match whatever alternative configurations are provided for the open end 40. A deeper or otherwise suitably configured cap, for example, could be applied to the open end 40 of the exemplary embodiment shown in FIG. 7.

Another cap (not shown) can be applied to the proximal end 48 of the tool tube 34 (or of the resilient portion 58) to seal that end 48 and prevent leakage of any fluid residue during transportation or storage of the fluid catch device 10.

Figure 12:
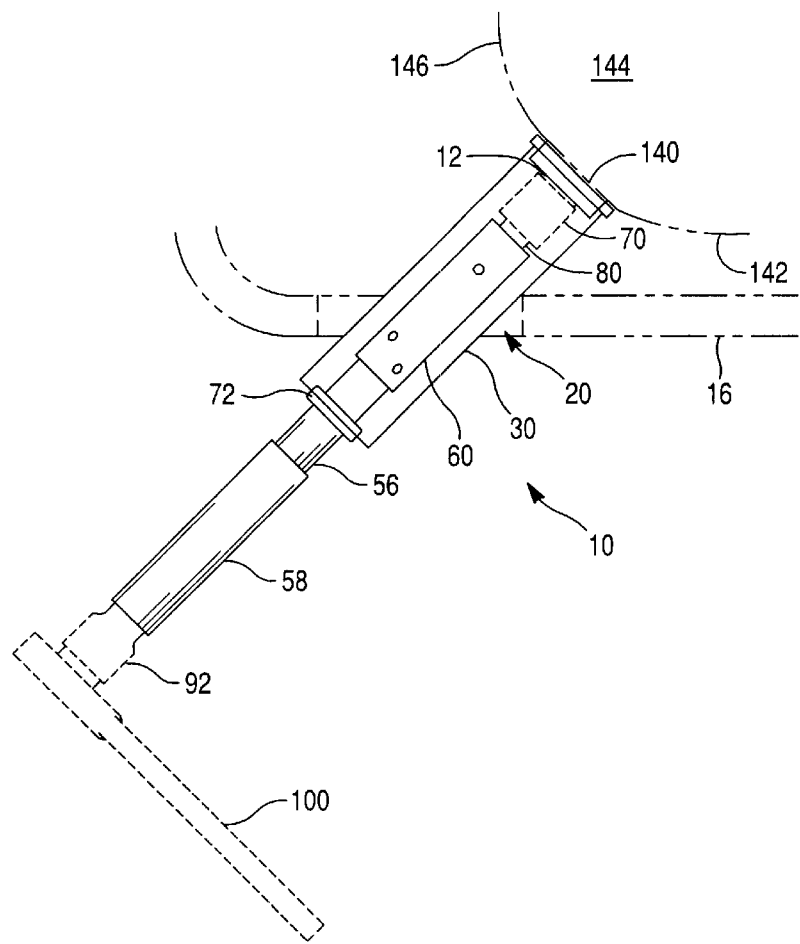
FIG. 12 is an elevational view of the fluid catch device shown in FIGS. 8–11, and illustrating how that fluid catch device can be used when access to a drain plug is provided obliquely with respect to the glide plate of a vehicle.

With reference to FIGS. 12 and 13, some access holes 20 and drain plugs 12 are positioned so that access to the drain plug 12 is gained at an angle. Such access holes typically are oval, instead of circular. The positioning of the drain plug 12 in FIG. 12 allows the fluid to be drained at the transition 140 between the bottom 142 of the fluid reservoir 144 and the side wall 146 thereof. This arrangement advantageously provides enough ground clearance that longer fluid receptacles 30 and/or longer tool tubes 34 can be used. It also advantageously facilitates draining of the fluid when the motorcycle is leaning toward that transition 140 on a kick stand.

It will be appreciated that, by providing suitable means for engaging the socket 70 or other suitable plug removal tool, the tool tube 34 can be provided in the form of a completely rigid unitary tube, especially in situations where sufficient ground clearance is available. Such a rigid tool tube 34 can be rotated to loosen and remove the drain plug 12, without needing the longer extension 92. A suitable leveraging feature (e.g., a perpendicularly extending arm) can be provided at or near the proximal end of such a rigid tool tube to facilitate manual turning of the rigid tool tube.

It may become desirable to use a tool tube 34 that is too small in diameter to accommodate the longer extension 92. Likewise, it may be desirable to avoid inserting the longer extension 92 into the tool tube 34 (e.g., by securely attaching the socket 70 or other suitable plug removal tool to the distal end 50 of the tool tube 34). Therefore, prior to arranging the open end 40 of fluid receptacle 30 over the drain plug 12, the drain plug 12 can be loosened just enough to make it relatively easy to turn the drain plug 12. It will be appreciated that the drain plug 12 can be "cracked" open enough to make it easy to turn but not so much that fluid rushes out. The open end 40 of the fluid receptacle 30 thereafter can be applied over the drain plug 12. The drain plug 12 then is removed by turning the tool tube 34 in the manner described above. The exemplary fluid catch device 10 thus can be used in different ways depending on the particular environment and needs of the user. It provides a versatility and convenience heretofore unachieved.

While this invention has been described as having a preferred design and implementation, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

What is claimed is:

1. A fluid catch device adapted to prevent spills when used during removal of a drain plug from a fluid drain opening located in an area of limited access, said fluid catch device comprising:

an elongated fluid receptacle having an open end and an opposite end;

a fluid port in fluid communication with the fluid receptacle, said fluid port being adapted to drain fluid from the fluid receptacle; and a tool tube extending at least from the opposite end of the fluid receptacle toward the open end of the fluid receptacle, said tool tube having a proximal end that opens outside of the opposite end of the fluid receptacle and a distal end directed toward the open end of the fluid receptacle, said tool tube being adapted to receive at least part of a drain plug loosening tool at the distal end, said fluid receptacle and tool tube having a combined length that is larger than a distance between a fluid drain obstruction, spaced a predetermined distance below a fluid drain and the fluid drain, the distance defining the area of limited access, and the fluid drain obstruction defining a guide for said fluid receptacle to surround the fluid drain, said fluid receptacle being narrow enough to engage a surface surrounding the fluid drain while the proximal end extends out from the area of limited access, beyond the fluid drain obstruction when said fluid receptacle surrounds the fluid drain for discharging fluid through the tool tube, and said tool tube is torqued to remove the drain plug from the fluid drain.

2. The fluid catch device of claim 1, wherein the combined length is larger than a distance between a glide plate and a fluid drain located behind the glide plate.

3. The fluid catch device of claim 1, wherein the fluid receptacle is adapted to remain engaged against the surface surrounding the fluid drain during removal of the drain plug from the fluid drain, to prevent splashing of fluid against the fluid drain obstruction.

4. The fluid catch device of claim 1, wherein the combined length is at least about 9 inches.

5. The fluid catch device of claim 1, wherein the combined length is between about 10 inches and about 12 inches.

6. The fluid catch device of claim 1, wherein the fluid receptacle is at least 5 inches in length.

7. The fluid catch device of claim 6, wherein the fluid receptacle is no wider than about 2 inches for a distance along its length of at least about 3 inches from the open end.

8. The fluid catch device of claim 1, wherein the opposite end of the fluid receptacle has a grommet that sealingly engages a circumferential surface of the tool tube.

9. The fluid catch device of claim 8, wherein the tool tube is axially slidable through the grommet to adjust spacing of the distal end of the tool tube from the open end of the fluid receptacle.

10. The fluid catch device of claim 9, wherein the tool tube also is rotatable within the grommet to effect turning of the drain plug.

11. The fluid catch device of claim 8, wherein said tool tube comprises:
   two resilient portions at which said distal and proximal ends, respectively, are defined; and
   a rigid intermediate portion defining said circumferential surface.

12. The fluid catch device of claim 9, further comprising a stop mechanism adapted to limit the range of axial travel of the tool tube through the grommet, to prevent the tool tube from being inadvertently withdrawn completely out of the grommet.

13. The fluid catch device of claim 1, further comprising a resilient adaptor disposed around the fluid receptacle, the resilient adaptor having dimensions and resiliency characteristics such that, when the resilient adaptor is inserted into an aperture of the fluid drain obstruction, which aperture has any diameter with a predetermined range, the resilient adaptor engages circumferential walls of the aperture with enough force to support the fluid catch device in the aperture, while permitting the open end of the fluid receptacle to reach the fluid drain.

14. The fluid catch device of claim 1, wherein the fluid receptacle is tubular.

15. The fluid catch device of claim 1, wherein the fluid port is in fluid communication with an interior of the tool tube, to permit the flow of fluid from the fluid receptacle, through the fluid port, into the tool tube and out through the proximal end thereof.

16. A fluid catch device adapted to prevent spills when used during removal of a drain plug located in an area of limited access, said fluid catch device comprising:
   an elongated fluid receptacle having an open end and an opposite end;
   a fluid port in fluid communication with the fluid receptacle; and
   a tool tube extending at least from the opposite end of the fluid receptacle toward the open end of the fluid receptacle, said tool tube having a proximal end that opens outside of the opposite end of the fluid receptacle and a distal end directed toward the open end of the fluid receptacle, said tool tube being adapted to receive at least part of a drain plug loosening tool at said distal end, and said tool tube slidably disposed in said fluid receptacle,
   said fluid receptacle and tool tube having dimensions that facilitate insertion of the fluid receptacle into an area of limited access so that the fluid receptacle engages a surface surrounding a fluid drain in which the drain plug is received, said fluid receptacle being adapted to remain engaged to the surface during removal of the drain plug, thereby to prevent splashing of fluid on access limiting features in the area of limited access.

17. The fluid catch device of claim 16, wherein the dimensions of the fluid receptacle and tool tube include a combined length of the fluid receptacle and tool tube that is at least about 9 inches.

18. The fluid catch device of claim 17, wherein the combined length is between about 10 inches and about 12 inches.

19. The fluid catch device of claim 16, wherein the fluid receptacle is at least about 5 inches in length.

20. The fluid catch device of claim 19, wherein the fluid receptacle is no wider than about 2 inches for a distance along its length of at least about 3 inches from the open end.

21. The fluid catch device of claim 16, wherein the opposite end of the fluid receptacle has a grommet that sealingly engages a circumferential surface of the tool tube.

22. The fluid catch device of claim 21, wherein the tool tube is axially slidable through the grommet to adjust spacing of the distal end of the tool tube from the open end of the fluid receptacle.

23. The fluid catch device of claim 22, wherein the tool tube also is rotatable within the grommet to effect turning of the drain plug.

24. The fluid catch device of claim 21, wherein the tool tube comprises:
   two resilient portions at which said distal and proximal ends, respectively, are defined; and
   a rigid intermediate portion defining said circumferential surface.

25. The fluid catch device of claim 22, further comprising a stop mechanism adapted to limit the range of axial travel of the tool tube through the grommet, to prevent the tool tube from being inadvertently withdrawn completely out of the grommet.

26. The fluid catch device of claim 16, further comprising a resilient adaptor disposed around the fluid receptacle, the resilient adaptor having dimensions and resiliency characteristics such that, when the resilient adaptor is inserted into an aperture of a fluid drain obstruction, which aperture has any diameter within a predetermined range, the resilient adaptor engages circumferential walls of the aperture with enough force to support the fluid catch device in the aperture, while permitting the open end of the fluid receptacle to reach the fluid drain.

27. The fluid catch device of claim 16, wherein the fluid receptacle is tubular.

28. The fluid catch device of claim 16, wherein the fluid port is in fluid communication with an interior of the tool tube, to permit the flow of fluid from the fluid receptacle, through the fluid port, into the tool tube and out through the proximal end thereof.

29. A method of removing a drain plug, in a spill-less manner, from a fluid drain located in an area of limited access, said method comprising:
   providing a fluid catch device having a fluid receptacle including an open end and an opposite end, a fluid port in fluid communication with the fluid receptacle, and a tool tube including a proximal end extending beyond the opposite end of the fluid receptacle and a distal end internally of the fluid receptacle, the distal end including a drain plug loosening tool, the fluid catch device having dimensions that facilitate insertion of the fluid receptacle into the area of limited access so that the open end of the fluid receptacle engages a surface surrounding the fluid drain;
   inserting the fluid receptacle into the area of limited access so that the fluid receptacle engages the surface surrounding the fluid drain and so that the drain plug loosening tool engages the drain plug;
   actuating the drain plug loosening tool by torquing the drain plug loosening tool to loosen the drain plug from the fluid drain;

removing the drain plug from the fluid drain while keeping the fluid receptacle engaged against the surface surrounding the fluid drain, so that substantially all fluid draining from the fluid drain enters the fluid receptacle; and directing the fluid from the fluid receptacle through the fluid port and tool tube, out of the area of limited access, substantially without contaminating the area of limited access with such fluid.

30. The method of claim 29, further comprising the step of withdrawing a portion of the drain plug loosening tool from the fluid catch device after said actuating step, said step of removing the drain plug being performed by rotating the tool tube that holds a remaining other portion of the drain plug loosening tool.

31. The method of claim 30, wherein rotation of the tool tube during removal of the drain plug causes the tool tube to move axially with respect to the fluid receptacle away from the surface surrounding the fluid drain, so that the fluid receptacle can remain engaged with the surface during removal of the drain plug.

32. The method of claim 30, wherein said step of directing the fluid from the fluid receptacle is performed through the tool tube.

33. The method of claim 29, wherein the area of limited access is limited by a vehicle glide plate, said step of inserting the fluid receptacle into the area of limited access comprising the step of inserting the fluid receptacle through a hole in the vehicle glide plate.

34. The method of claim 33, wherein said vehicle glide plate is at least about 1½ inches from the fluid drain.

35. The method of claim 33, further comprising the step of resiliently engaging a circumferential wall of the hole with an external surface of the fluid catch device so that the fluid catch device remains supported by the glide plate after said step of inserting the fluid receptacle into the area of limited access.

* * * * *